United States Patent
Preisler et al.

(10) Patent No.: US 10,751,984 B2
(45) Date of Patent: Aug. 25, 2020

(54) METHOD OF BONDING A THERMOPLASTIC COMPONENT TO A CARPETED COMPONENT AND THE CARPETED COMPONENT TO A CELLULOSE-BASED CORE IN A SINGLE PRESSING STEP

(71) Applicant: GLOBAL IP HOLDINGS, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 939 days.

(21) Appl. No.: 14/603,426

(22) Filed: Jan. 23, 2015

(65) Prior Publication Data
US 2015/0136321 A1    May 21, 2015

Related U.S. Application Data

(63) Continuation-in-part of application No. 13/517,877, filed on Jun. 14, 2012, now abandoned.

(51) Int. Cl.
*B32B 7/00* (2019.01)
*B29C 65/00* (2006.01)
(Continued)

(52) U.S. Cl.
CPC .......... *B32B 37/182* (2013.01); *B32B 37/146* (2013.01); *B29C 65/02* (2013.01);
(Continued)

(58) Field of Classification Search
CPC . B60N 3/042; B60N 3/00; B60N 3/02; B60N 3/04; B32B 2605/003;
(Continued)

(56) References Cited

U.S. PATENT DOCUMENTS 3,388,018 A * 6/1968 Squier ................. B29C 66/71
156/242
3,651,563 A    3/1972 Volkmann
(Continued)

OTHER PUBLICATIONS

Office Action; Related U.S. Appl. No. 13/479,974; dated Oct. 15, 2014.
(Continued)

*Primary Examiner* — Abbas Rashid
*Assistant Examiner* — Matthew Hoover
(74) *Attorney, Agent, or Firm* — Brooks Kushman P.C.

(57) ABSTRACT

A method of bonding a thermoplastic component to a carpeted component and the carpeted component to cellulose-based core in a single pressing step is provided. The method includes providing a base component of a reinforced thermoplastic material, the thermoplastic component, a fibrous thermoplastic carpet or mat between the components, a sheet of thermoplastic adhesive and a core of cellulose-based material. The method also includes heating the thermoplastic component and the carpet at the interface between the thermoplastic component and the carpet for a period of time to soften the carpet. The method finally includes pressing the components, the sheet, the core and the softened carpet together under a pressure to cause the softened carpet to flow. The carpet at the interface is transformed into a solid bonding layer to bond the components together and the sheet bonds the base component and the core together to create a finished structure.

18 Claims, 4 Drawing Sheets

(51) Int. Cl.
  *B32B 37/00* (2006.01)
  *B32B 37/18* (2006.01)
  *B32B 37/14* (2006.01)
  *B29C 65/48* (2006.01)
  *B29C 65/06* (2006.01)
  *B32B 37/06* (2006.01)
  *B32B 37/12* (2006.01)
  *B29C 65/14* (2006.01)
  *B29C 65/02* (2006.01)
  *B29C 65/16* (2006.01)
  *B29C 65/50* (2006.01)
  *B29C 65/08* (2006.01)
  *B29C 65/20* (2006.01)
  *B29L 31/00* (2006.01)

(52) U.S. Cl.
  CPC .......... *B29C 65/06* (2013.01); *B29C 65/0672* (2013.01); *B29C 65/08* (2013.01); *B29C 65/1412* (2013.01); *B29C 65/16* (2013.01); *B29C 65/20* (2013.01); *B29C 65/4815* (2013.01); *B29C 65/5014* (2013.01); *B29C 65/5057* (2013.01); *B29C 66/112* (2013.01); *B29C 66/114* (2013.01); *B29C 66/1122* (2013.01); *B29C 66/472* (2013.01); *B29C 66/5346* (2013.01); *B29C 66/71* (2013.01); *B29C 66/729* (2013.01); *B29C 66/7212* (2013.01); *B29C 66/7254* (2013.01); *B29C 66/7294* (2013.01); *B29C 66/7392* (2013.01); *B29C 66/73921* (2013.01); *B29C 66/81425* (2013.01); *B29C 66/8322* (2013.01); *B29C 66/919* (2013.01); *B29C 66/91411* (2013.01); *B29C 66/929* (2013.01); *B29L 2031/7652* (2013.01); *B32B 37/06* (2013.01); *B32B 2037/1215* (2013.01); *B32B 2309/02* (2013.01); *B32B 2309/12* (2013.01); *B32B 2398/20* (2013.01); *B32B 2471/02* (2013.01)

(58) Field of Classification Search
  CPC ......... B32B 2471/02; B32B 7/12; B32B 7/00; B32B 7/10; B32B 37/00; B32B 37/10; B32B 37/18; B32B 37/182; B32B 37/14; B32B 37/146; B32B 2471/00; B32B 2605/00
  See application file for complete search history.

(56) References Cited

U.S. PATENT DOCUMENTS

| | | | |
|---|---|---|---|
| 3,750,525 A | 8/1973 | Waters et al. | |
| 4,717,612 A | 1/1988 | Shackelford | |
| 5,026,445 A | 6/1991 | Mainolfi et al. | |
| 5,074,726 A | 12/1991 | Betchel et al. | |
| 5,253,962 A | 10/1993 | Close, Jr. | |
| 5,298,694 A | 3/1994 | Thompson et al. | |
| 5,316,604 A | 5/1994 | Fell | |
| 5,370,521 A | 12/1994 | McDougall | |
| 5,423,933 A | 6/1995 | Horian | |
| 5,502,930 A | 4/1996 | Burkette et al. | |
| 5,534,097 A | 7/1996 | Fasano et al. | |
| 5,683,782 A | 11/1997 | Duchene | |
| 5,744,210 A | 4/1998 | Hofmann et al. | |
| 5,750,160 A | 5/1998 | Weber et al. | |
| 5,915,445 A | 6/1999 | Rauenbusch | |
| 5,979,962 A | 11/1999 | Balentin et al. | |
| 6,030,490 A * | 2/2000 | Francisco | B29C 65/04 156/274.4 |
| 6,050,630 A | 4/2000 | Hochet | |
| 6,066,217 A | 5/2000 | Dibble et al. | |
| 6,102,464 A | 8/2000 | Schneider et al. | |
| 6,102,630 A | 8/2000 | Schneider et al. | |
| 6,435,577 B1 | 8/2002 | Renault | |
| 6,537,413 B1 | 3/2003 | Hochet et al. | |
| 6,615,762 B1 | 9/2003 | Scott | |
| 6,631,785 B2 | 10/2003 | Khambete et al. | |
| 6,655,299 B2 | 12/2003 | Preisler et al. | |
| 6,659,223 B2 | 12/2003 | Allison et al. | |
| 6,682,675 B1 | 1/2004 | Vandangeot et al. | |
| 6,682,676 B1 | 1/2004 | Renault et al. | |
| 6,748,876 B2 | 6/2004 | Preisler et al. | |
| 6,752,443 B1 | 6/2004 | Thompson et al. | |
| 6,790,026 B2 | 9/2004 | Vandangeot et al. | |
| 6,793,747 B2 | 9/2004 | North et al. | |
| 6,823,803 B2 | 11/2004 | Preisler | |
| 6,825,803 B2 | 11/2004 | Wixforth et al. | |
| 6,843,525 B2 | 1/2005 | Preisler | |
| 6,890,023 B2 | 5/2005 | Preisler et al. | |
| 6,905,155 B1 | 6/2005 | Presley et al. | |
| 6,926,348 B2 | 8/2005 | Krueger et al. | |
| 6,945,594 B1 | 9/2005 | Bejin et al. | |
| 6,981,863 B2 | 1/2006 | Renault et al. | |
| 7,014,259 B2 | 3/2006 | Heholt | |
| 7,059,646 B1 | 6/2006 | DeLong et al. | |
| 7,059,815 B2 | 6/2006 | Ando et al. | |
| 7,090,274 B1 | 8/2006 | Khan et al. | |
| 7,093,879 B2 | 8/2006 | Putt et al. | |
| 7,121,601 B2 | 10/2006 | Mulvihill et al. | |
| 7,188,881 B1 | 3/2007 | Sturt et al. | |
| 7,207,616 B2 | 4/2007 | Sturt | |
| 7,222,915 B2 | 5/2007 | Philippot et al. | |
| 7,264,685 B2 | 9/2007 | Katz et al. | |
| 7,316,788 B2 | 1/2008 | Autrey et al. | |
| 7,320,739 B2 | 1/2008 | Thompson, Jr. et al. | |
| 7,402,537 B1 | 7/2008 | Lenda et al. | |
| 7,419,713 B2 | 9/2008 | Wilkens et al. | |
| 7,530,322 B2 | 5/2009 | Angelini | |
| 7,628,440 B2 | 12/2009 | Berhardsson et al. | |
| 7,713,011 B2 | 5/2010 | Orszagh et al. | |
| 7,837,009 B2 | 11/2010 | Gross et al. | |
| 7,854,211 B2 | 12/2010 | Rixford | |
| 7,909,379 B2 | 3/2011 | Winget et al. | |
| 7,918,313 B2 | 4/2011 | Gross et al. | |
| 7,919,031 B2 | 4/2011 | Winget et al. | |
| 7,942,475 B2 | 5/2011 | Murray | |
| 7,963,243 B2 | 6/2011 | Quigley | |
| 8,069,809 B2 | 12/2011 | Wagenknecht et al. | |
| 8,117,972 B2 | 2/2012 | Winget et al. | |
| 8,133,419 B2 | 3/2012 | Burks et al. | |
| 8,298,675 B2 | 11/2012 | Allessandro et al. | |
| 8,475,884 B2 | 7/2013 | Kia | |
| 8,622,456 B2 | 1/2014 | Preisler et al. | |
| 8,690,233 B2 | 4/2014 | Preisler et al. | |
| 8,764,089 B2 | 7/2014 | Preisler et al. | |
| 8,795,465 B2 | 8/2014 | Preisler et al. | |
| 8,795,807 B2 | 8/2014 | Preisler et al. | |
| 8,808,827 B2 | 8/2014 | Preisler et al. | |
| 8,808,828 B2 | 8/2014 | Preisler et al. | |
| 8,808,829 B2 | 8/2014 | Preisler et al. | |
| 8,808,830 B2 | 8/2014 | Preisler et al. | |
| 8,808,831 B2 | 8/2014 | Preisler et al. | |
| 8,808,833 B2 | 8/2014 | Preisler et al. | |
| 8,808,834 B2 | 8/2014 | Preisler et al. | |
| 8,808,835 B2 | 8/2014 | Preisler et al. | |
| 8,834,985 B2 | 8/2014 | Preisler et al. | |
| 8,852,711 B2 | 8/2014 | Preisler et al. | |
| 8,859,074 B2 | 8/2014 | Preisler et al. | |
| 8,883,285 B2 | 8/2014 | Preisler et al. | |
| 9,527,268 B2 | 12/2016 | Preisler et al. | |
| 2004/0078929 A1 | 4/2004 | Schoemann | |
| 2005/0189674 A1 | 9/2005 | Hochet et al. | |
| 2006/0185866 A1 | 8/2006 | Jung et al. | |
| 2006/0008609 A1 | 10/2006 | Snyder et al. | |
| 2006/0255611 A1 | 11/2006 | Smith et al. | |
| 2007/0065264 A1 | 3/2007 | Sturt et al. | |
| 2007/0069542 A1 | 3/2007 | Steiger et al. | |
| 2007/0256379 A1 | 11/2007 | Edwards | |
| 2007/0258786 A1 | 11/2007 | Orszagh et al. | |
| 2008/0185866 A1 | 5/2008 | Jeong et al. | |
| 2009/0108639 A1 | 4/2009 | Sturt et al. | |

(56) References Cited

U.S. PATENT DOCUMENTS

| | | |
|---|---|---|
| 2010/0026031 A1 | 2/2010 | Jouraku |
| 2010/0086728 A1 | 4/2010 | Theurl et al. |
| 2010/0206467 A1 | 8/2010 | Durand et al. |
| 2011/0260359 A1 | 10/2011 | Durand et al. |
| 2011/0315310 A1 | 12/2011 | Trevisan et al. |
| 2012/0247654 A1 | 10/2012 | Piccin et al. |
| 2012/0315429 A1 | 12/2012 | Stamp et al. |
| 2013/0031752 A1 | 2/2013 | Davies |
| 2013/0075955 A1 | 3/2013 | Piccin et al. |
| 2013/0137798 A1 | 5/2013 | Piccin |
| 2013/0278002 A1 | 10/2013 | Preisler et al. |
| 2013/0278003 A1 | 10/2013 | Preisler et al. |
| 2013/0278007 A1 | 10/2013 | Preisler et al. |
| 2013/0278008 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280459 A1 | 10/2013 | Nakashima et al. |
| 2013/0280469 A1 | 10/2013 | Preisler et al. |
| 2013/0280472 A1 | 10/2013 | Preisler et al. |
| 2013/0312652 A1 | 11/2013 | Preisler et al. |
| 2013/0316123 A1 | 11/2013 | Preisler et al. |
| 2013/0333837 A1 | 12/2013 | Preisler et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0154461 A1 | 6/2014 | Preisler et al. |
| 2014/0225296 A1 | 8/2014 | Preisler et al. |
| 2014/0335303 A1 | 11/2014 | Preisler et al. |

OTHER PUBLICATIONS

Office Action; related U.S. Appl. No. 13/479,974; dated Mar. 20, 2014.
Office Action; related U.S. Appl. No. 13/686,362; dated Mar. 25, 2014.
Office Action; related U.S. Appl. No. 13/523,253; dated Mar. 25, 2014.
Office Action; related U.S. Appl. No. 13/688,972; dated Mar. 28, 2014.
Office Action; related U.S. Appl. No. 13/687,232; dated Mar. 28, 2014.
Office Action; related U.S. Appl. No. 13/689,809; dated Mar. 31, 2014.
Office Action; related U.S. Appl. No. 13/687,213; dated Mar. 31, 2014.
Office Action; related U.S. Appl. No. 13/690,265; dated Mar. 31, 2014.
Office Action; related U.S. Appl. No. 13/762,904; dated Apr. 8, 2014.
Office Action; related U.S. Appl. No. 13/762,800; dated Apr. 8, 2014.
Office Action; related U.S. Appl. No. 13/762,861; dated Apr. 9, 2014.
Office Action; related U.S. Appl. No. 13/690,566; dated Apr. 9, 2014.
Office Action; related U.S. Appl. No. 13/762,832; dated Apr. 11, 2014.
Office Action; related U.S. Appl. No. 13/762,921; dated Apr. 14, 2014.
Notice of Allowance; related U.S. Appl. No. 13/686,388; dated Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now U.S. Pat. No. 8,690,233); dated Nov. 20, 2013.
Office Action; related U.S. Appl. No. 13/523,209 (now U.S. Pat. No. 8,622,456) dated Apr. 29, 2013.
Decision on Appeal; U.S. Patent and Trademark Office Patent Trial Appeal Board, U.S. Appl. No. 13/517,877, issued Apr. 1, 2016. (7 pages).
United States Patent and Trademark Office, Non-Final Office Action for U.S. Appl. No. 15/163,797, dated Sep. 19, 2019.

* cited by examiner

METHOD OF BONDING A THERMOPLASTIC COMPONENT TO A CARPETED COMPONENT AND THE CARPETED COMPONENT TO A CELLULOSE-BASED CORE IN A SINGLE PRESSING STEP

CROSS-REFERENCE TO RELATED APPLICATIONS

This application is a continuation-in-part of U.S. patent application Ser. No. 13/517,877 filed Jun. 14, 2012, the disclosure of which is hereby incorporated in its entirety by reference herein.

TECHNICAL FIELD OF THE INVENTION

This invention relates, in general, to the field of plastics joining technologies and, in particular, to methods of bonding a thermoplastic component to a carpeted component and the carpeted component to a cellulose-based core in a single pressing step.

OVERVIEW

A wide variety of welding technologies exist to join or bond plastic components together such as: ultrasonic welding; vibration welding; thermal welding; spin welding; infrared welding; hot plate welding; and laser welding. U.S. Pat. Nos. 6,066,217 and 5,026,445 are examples of such welding technologies.

Also, a wide variety of adhesives such as liquid and heat-sensitive solid film adhesive may be used to join plastic components together. Oftentimes a mold is used in the bonding process. U.S. Pat. Nos. 8,133,419; 5,534,097 and 2011/0315310 are examples.

It is often desirable to attach or bond a plastic component to a carpeted component. Such carpeted plastic components are shown or described in the following U.S. Pat. Nos. 5,026,445; 6,050,630; 6,537,413; 6,748,876; 6,823,803; 7,419,713; 7,919,031; 7,909,379; 2012/0315429; 2011/0315310; and 2005/0189674.

SUMMARY OF EXAMPLE EMBODIMENTS

An object of at least one embodiment of the present invention is to provide a method of bonding a thermoplastic component to a carpeted component and the carpeted component to a cellulose-based core in a single pressing step wherein the carpet is transformed to be a binder thereby resulting in a finished article with a strong bond between the components, and a pleasing appearance.

Another object of at least one embodiment of the present invention is to provide a method of bonding a thermoplastic component to a carpeted component and the carpeted component to a cellulose-based core in such a way that results in a number of flexible design options.

In carrying out the above objects and other objects of at least one embodiment of the present invention, a method of bonding a thermoplastic component to a carpeted component and the carpeted component to a cellulose-based core is provided. The method includes providing a base component of a reinforced thermoplastic material, a thermoplastic component, a fibrous carpet between the components, a sheet of thermoplastic adhesive and a core of cellulose-based material. The carpet has a large number of cavities. The carpet overlies and is in contact with the base component. The thermoplastic component overlies and is in contact with the carpet. The carpet is made of a thermoplastic material adapted to bond to the thermoplastic component in response to heat at the interface between the thermoplastic component and the carpet. The method also includes heating the thermoplastic component and the carpet at the interface between the thermoplastic component and the carpet for a period of time to soften the carpet. The method finally includes pressing the components, the sheet, the core and the softened carpet together under a pressure to cause the softened carpet to flow and at least partially fill the cavities. The carpet at the interface is transformed into a solid bonding layer to bond the components together and the sheet bonds the base component and the core together to create a finished structure.

The carpet may be a decorative carpet made of woven or non-woven fibers.

The carpet may have an upper thermoplastic fiber layer and a lower thermoplastic backing layer.

At least a portion of the carpet may bond the components together.

The entire carpet may bond the components together.

The thermoplastic of the carpet and the thermoplastic of the thermoplastic component may be polypropylene.

The thermoplastic of the carpet and the thermoplastic of the thermoplastic component may be polyester.

The step of heating may occur before the step of pressing wherein the components and the fabric are cold-pressed during the step of pressing.

The base component may be a skin or layer made of a fiber-reinforced thermoplastic material.

The carpet may have a surface area greater than a surface area of the thermoplastic component wherein a portion of the carpet spaced away from the interface is not transformed and forms an outer exterior surface of the finished structure.

The carpet may be a decorative carpet wherein the portion of the outer exterior surface is a decorative surface.

The step of heating may occur during the step of pressing and the thermoplastic component and the carpet are welded to each other at the interface.

A temperature at the interface may lie in a range of 160° C. to 200° C. during the step of heating.

The pressure may lie in a range of $1 \times 10^6$ Pa to $3 \times 10^6$ Pa. Both of the components may be heated to a temperature above a softening temperature of the carpet during the step of heating. The step of pressing may include the step of press molding in a compression mold.

Further in carrying out the above objects and other objects of at least one embodiment of the present invention, a method of bonding thermoplastic and cellulose-based components together is provided. The method includes providing first and second thermoplastic components, a fibrous carpet having a large number of cavities between the components, a sheet of thermoplastic adhesive and a core of cellulose-based material. The carpet overlies and is in contact with the first component. The second component overlies and is in contact with the carpet. The carpet is made of a thermoplastic material adapted to bond to the first and second thermoplastic components in response to heat at the interfaces between the components and the carpet. The method also includes heating the components to a temperature above a softening temperature of the carpet. Heat from the heated components heats the carpet at the interfaces between the components and the carpet for a period of time to soften the carpet. The method finally includes pressing the components, the sheet, the core and the softened carpet together under a pressure to cause the softened carpet to flow and at least partially fill the cavities in the carpet. The carpet at the interfaces is transformed into a solid bonding layer to bond the components together and the sheet bonds the first component and the core together to create a finished structure.

Still further in carrying out the above objects and other objects of at least one embodiment of the invention, a method of bonding thermoplastic and cellulose-based components together is provided. The method includes providing first and second thermoplastic components, a fibrous mat having a large number of cavities between the components, a sheet of thermoplastic adhesive and a core of cellulose-based material. The mat overlies and is in contact with the first component. The second component overlies and is in contact with the mat. The mat is made of a thermoplastic material adapted to bond to the first and second thermoplastic components in response to heat at the interfaces between the components and the mat. The method also includes heating the components to a temperature above a softening temperature of the mat. Heat from the heated components heats the mat at the interfaces between the components and the mat for a period of time to soften the mat. The method further includes pressing the components, the sheet, the core and the softened mat together under a pressure to cause the softened mat to flow and at least partially fill the cavities in the mat. The mat at the interfaces is transformed into a solid bonding layer to bond the components together and the sheet bonds the first component and the core together to create a finished structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF THE EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
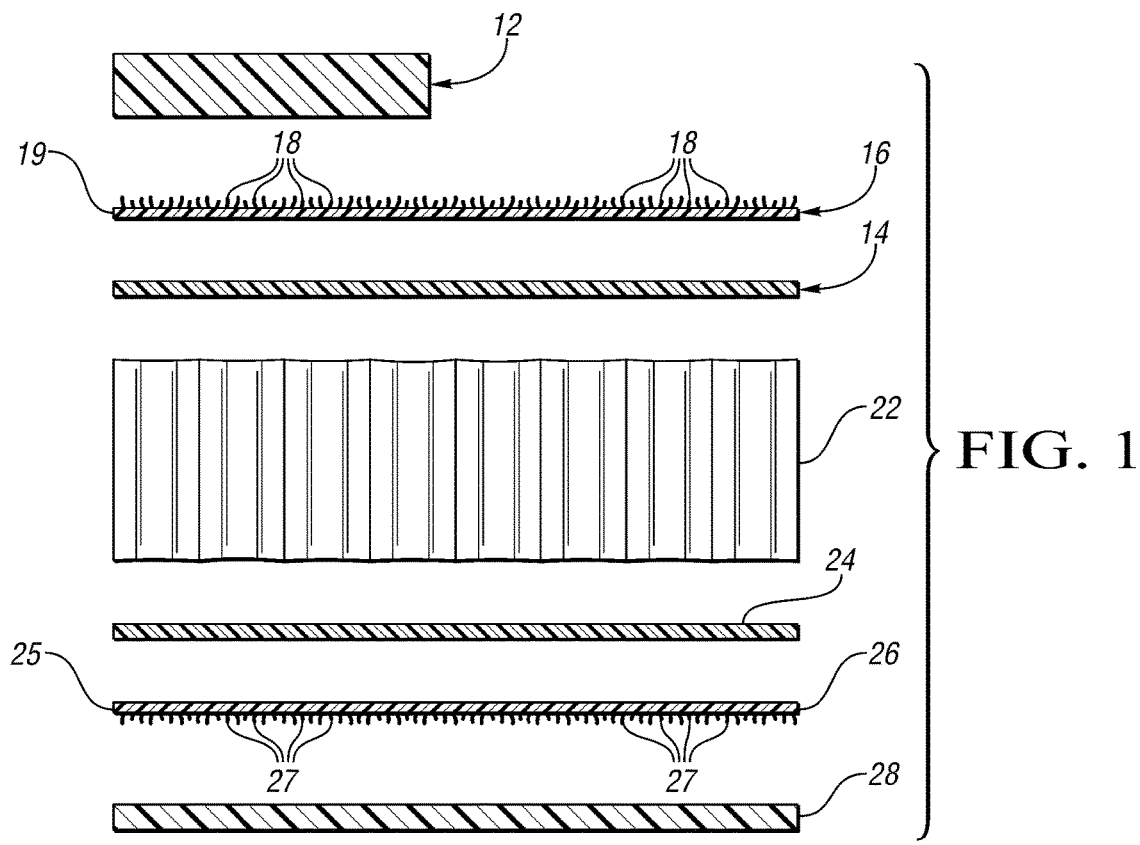
FIG. 1 is a side sectional view of a stack of components which are heated and pressed together to form the finished structure of FIG. 2.
Figure 2:
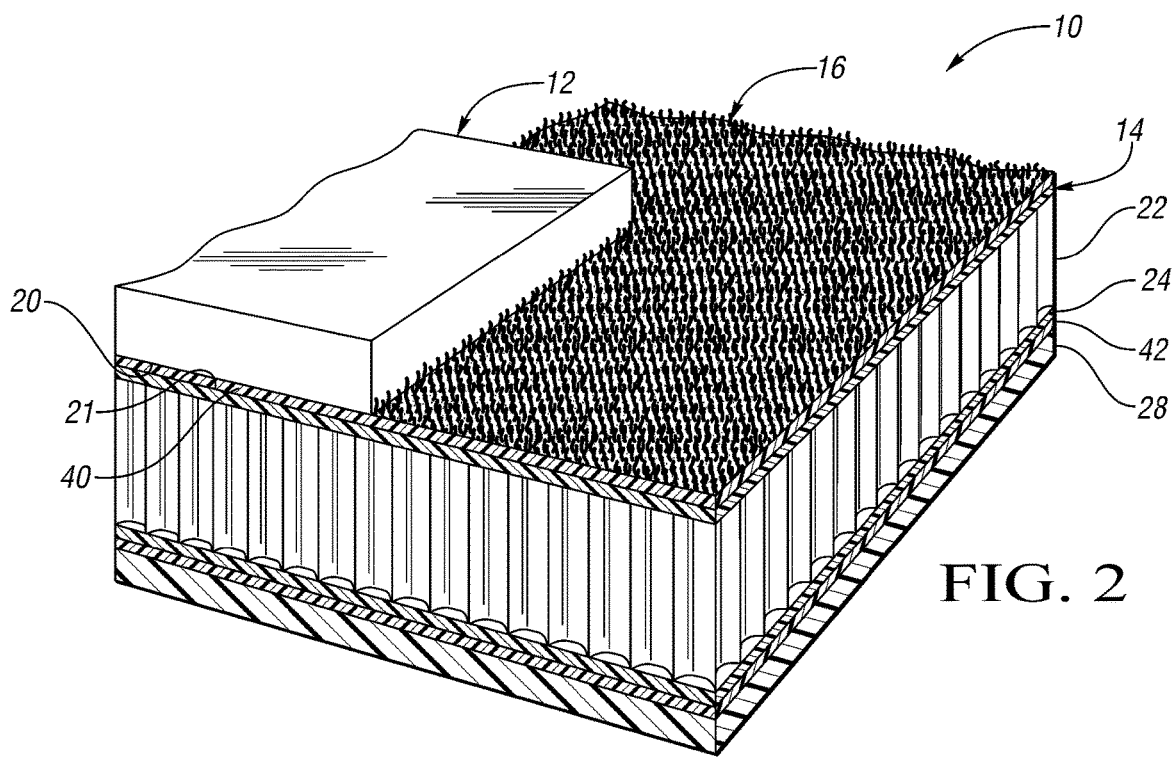
FIG. 2 is a perspective view, partially broken away and in cross section, of a finished structure constructed in accordance with at least one embodiment of a method of the present invention.
Figure 3:
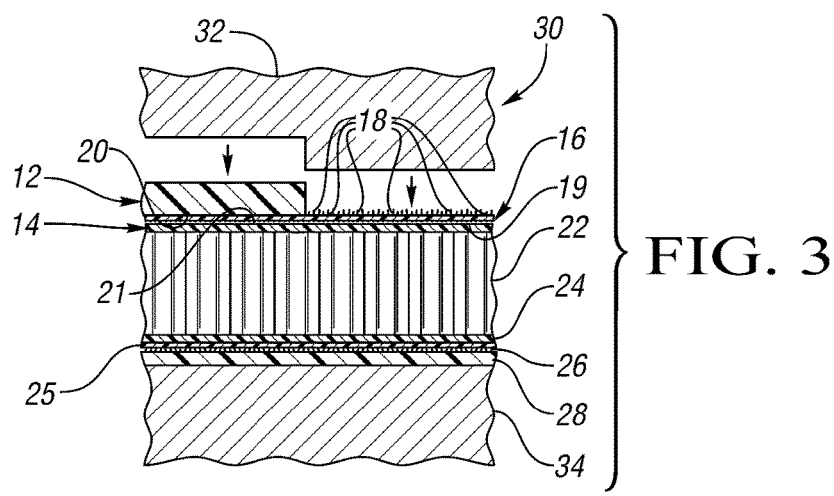
FIG. 3 is a side view, partially broken away and in cross section, of a compression mold in its open position and the components of FIG. 2 located between two mold halves of the mold.
Figure 5:
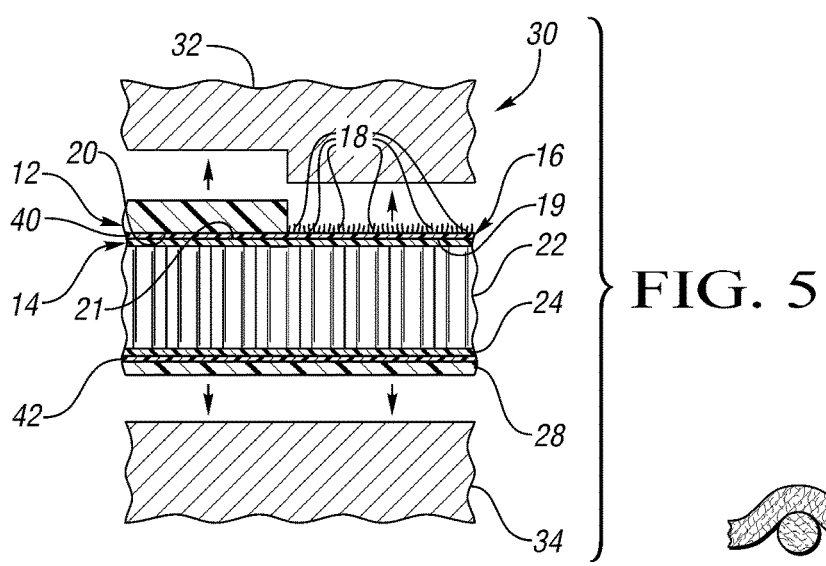
FIG. 5 is a view similar to the view of FIG. 3 with the mold again in its open position after pressing with the finished structure ready for removal from the mold.

Referring now to the drawing Figures, FIGS. 2 and 5 show a finished structure, generally indicated at 10, constructed in accordance with at least an embodiment of the present invention. The various components of the finished structure 10 prior to creation of the finished structure are shown in FIGS. 1 and 3. In general, the method of the invention provides a method of bonding at least one thermoplastic component, generally indicated at 12, to a carpeted thermoplastic base component, generally included at 14.

The method includes the steps of providing the base component 14, the thermoplastic component 12 and a fibrous decorative carpet, generally indicated at 16, between the components 12 and 14. The carpet 16 preferably includes an upper thermoplastic fibrous layer including thermoplastic fibers 18 and a lower thermoplastic backing layer 19. The carpet 16 has a large number of cavities between the fibers 18 of the fibrous layer. As shown in FIGS. 2-5, the carpet 16 overlies and is in contact with the base component 14 and the thermoplastic component 12 overlies and is in contact with the carpet 16. The upper and lower layers of the carpet 16 are preferably made of a thermoplastic material adapted to bond to the thermoplastic components 12 and 14, respectively, in response to heat at the interfaces 20 and 21 (FIGS. 2-5) between the thermoplastic components 12 and 14, respectively, and the carpet 16.

The base component 14 is preferably a reinforced thermoplastic skin. The method may also include the step of providing a cellular thermoplastic core 22, a second reinforced thermoplastic skin 24 and a second decorative thermoplastic fibrous carpet 26. The carpet 26 preferably includes an upper thermoplastic fiber layer including thermoplastic fibers 27 and a lower thermoplastic backing layer 25. The carpet 26 has a large number of cavities between the fibers 27. Also provided is a second thermoplastic component 28 preferably in the form of a thermoplastic sheet which preferably completely covers or overlies the carpet 26.

Figure 4:
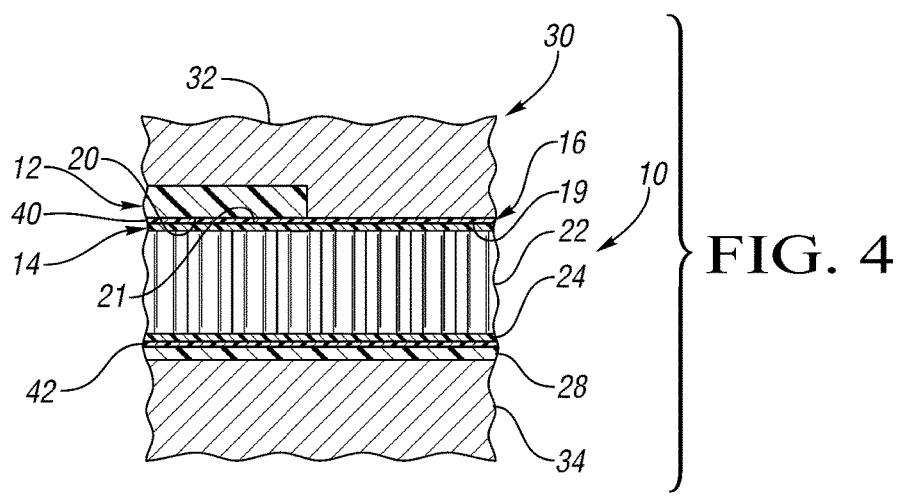
FIG. 4 is a view similar to the view of FIG. 3 with the mold halves pressed together in their closed position.

All (as shown in FIGS. 3-5) or a subset of the components 12-28 are placed or inserted in a compression mold, generally indicated at 30, including an upper mold half 32 and a lower mold half 34. The mold 30 may be heated (if the components 12-28 are not pre-heated) or may be a cold-pressing mold (if the components are pre-heated outside the mold 30). FIG. 3 shows the mold 30 in its open position to receive the components 12-28 and the mold is shown in its closed, pressing position in FIG. 4. FIG. 5 shows the mold 30 again open to allow the created finished structure 10 to be removed from the mold 30.

The method of at least one embodiment of the present invention includes heating (either inside or outside the mold 30) the thermoplastic component 12 and the carpet 16 at the interface 20 between the thermoplastic component 12 and the carpet 16 for a period of time to soften the thermoplastic of the carpet 16.

Preferably, the component 14 is also heated (either inside or outside the mold 30) to heat the carpet 16 at the interface 21 between the component 14 and the carpet 16. If so included in the finished article 10, the other components 22-28 are also heated either in or outside of the mold 30 to soften the thermoplastic of the carpet 26 at the interfaces between the components 24 and 28 and the carpet 26.

The method of at least one embodiment of the present invention also includes pressing the components 12 and 14 and the softened carpet 16 together under a pressure in the mold 30 to cause the softened carpet 16 to flow and at least partially fill the cavities between the fibers 18 wherein a portion of the carpet 16 at the interfaces 20 and 21 is transformed into a solid bonding layer 40 (FIG. 5) to bond the components 12 and 14 together to at least partially create the finished structure 10.

If so included in the finished article, the other components 22-28 are also pressed together with the heated components 12-16 in the mold 30. In this way, the softened carpet 26 flows and at least partially fills the cavities between its fibers 27 wherein the entire carpet 26 is transformed into a second solid bonding layer 42 (FIG. 5) to bond the components 24 and 28 together to help create the finished structure 10.

Figure 6:
FIG. 6 is a side view, partially broken away and in cross section, of a woven carpet or mat for use in the method of at least one embodiment of the present invention.

One or both of the carpets 16 and 26 may be a decorative carpet having upper and/or lower layers made of woven (i.e. FIG. 6) or non-woven fibers. Typically, the carpets 16 and 26 have an upper thermoplastic fibrous layer having fibers 18 and 27, respectively, and a lower thermoplastic bonding layer 19 and 25, respectively.

As shown in FIG. 5, the solid portion or layer 40 of the upper carpet 16 bonds the components 12 and 14 together while the entire lower carpet 26 as thermoformed into the solid bonding layer 42 bonds the components 24 and 28 together.

The thermoplastic of the components 12-28 may preferably be polypropylene or polyester. Other compatible thermoplastics, however, may also be used. A temperature at one or more of the interfaces typically lies in a range of 160° C. to 200° C. during the step of heating and the pressure in the mold 30 typically lies in a range of $1 \times 10^6$ Pa to $3 \times 10^6$ Pa.

The step of heating may occur either before or during the step of pressing. For example, the thermoplastic component may be welded to the carpet thereby joining the thermoplastic component to the carpet. Such welding may be ultrasonic welding, vibration welding; thermal welding; spin welding; infrared welding; hot plate welding or laser welding.

Figure 7:
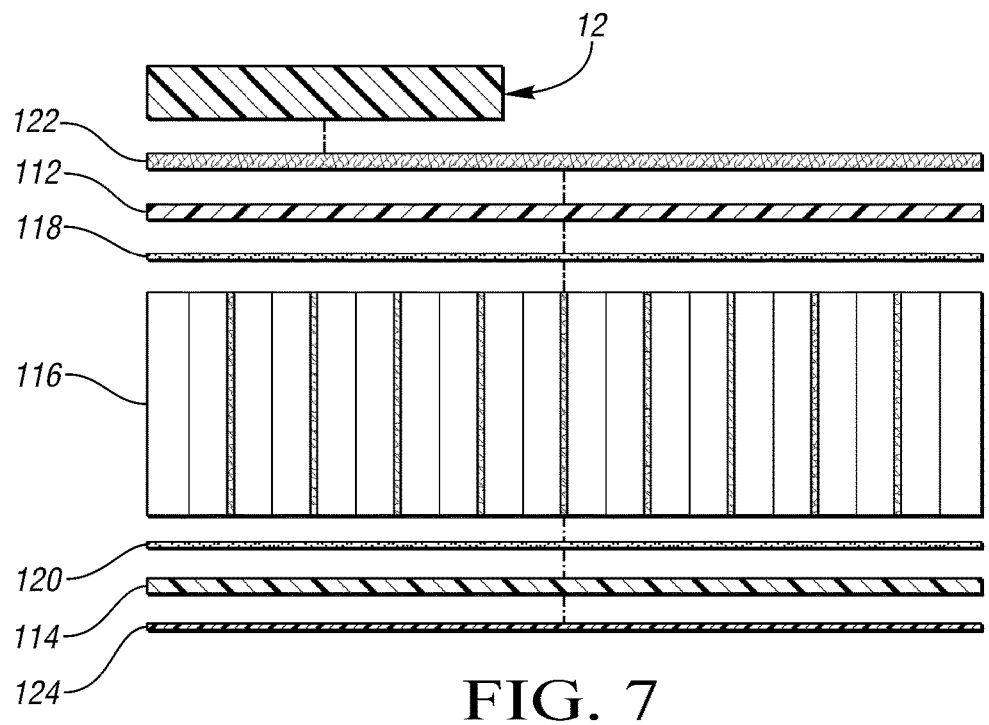
FIG. 7 is a side sectional view showing a stack of various separate sheets, layers or components of thermoplastic-based and cellulose-based material prior to being compression molded into a composite, sandwich structure.
Figure 8:
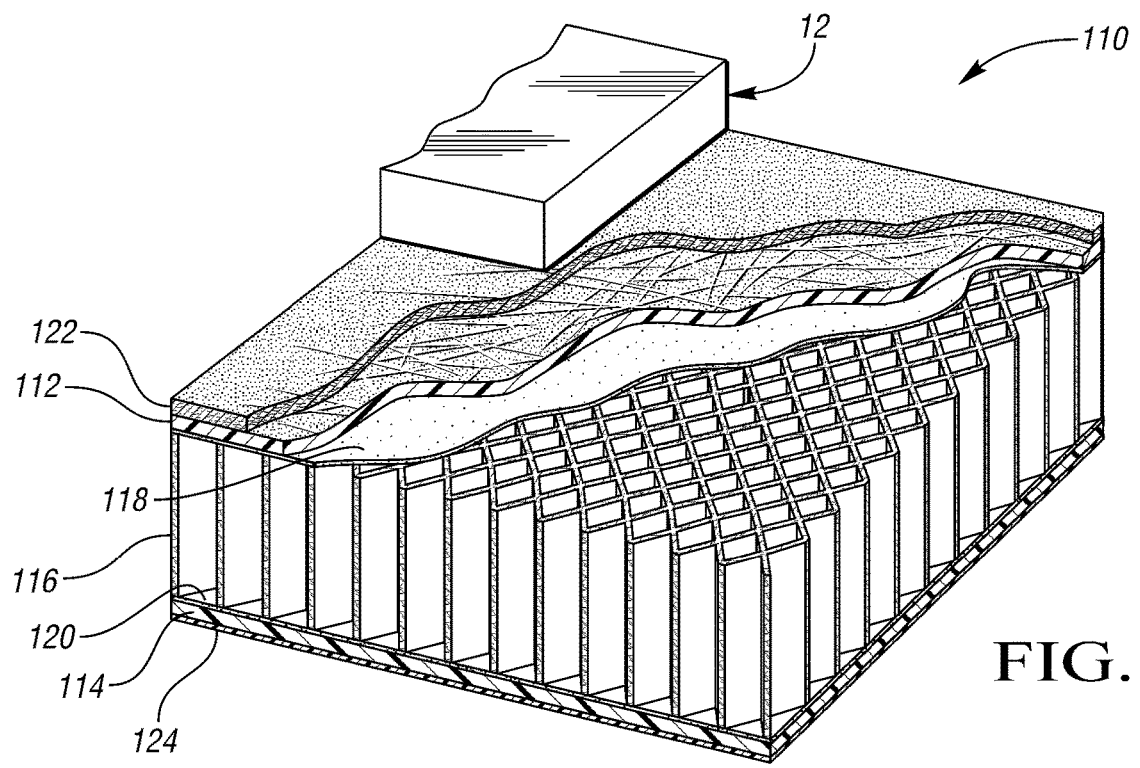
FIG. 8 is a top perspective view, partially broken away and in cross section, of the resulting composite structure after press molding.
Figure 9:
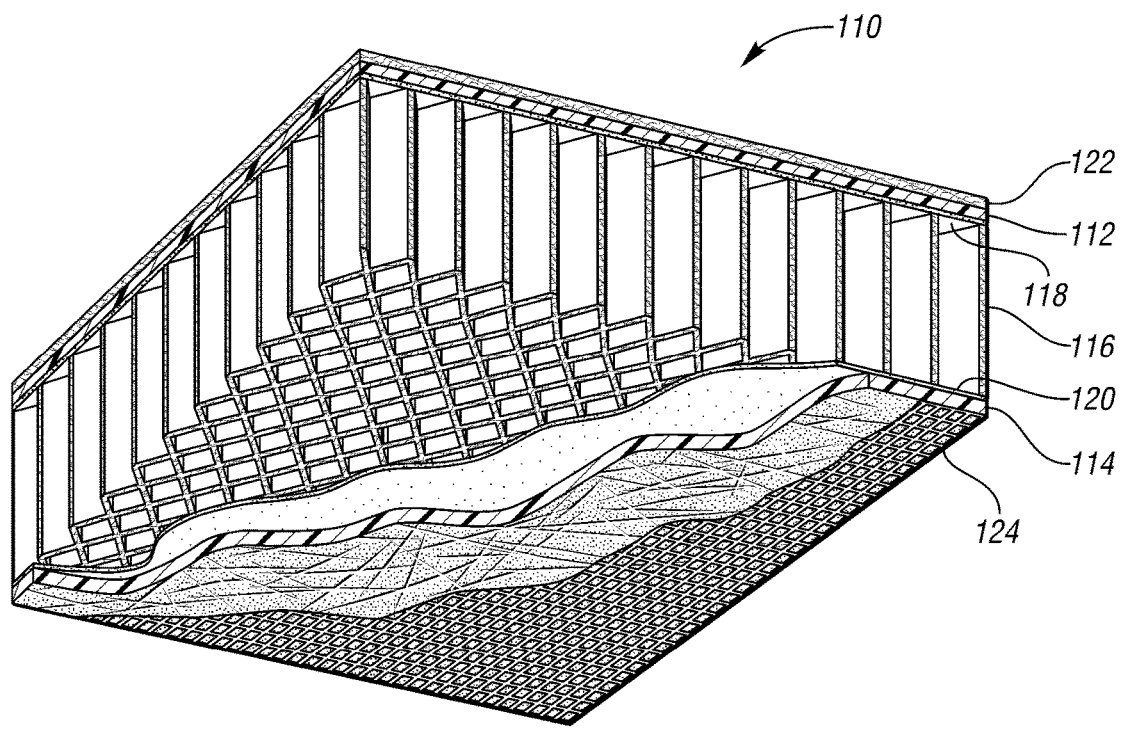
FIG. 9 is a view similar to the view of FIG. 8 but providing a bottom perspective view.

Referring now to the FIGS. 8 and 9, a second embodiment of a compression-molded, sandwich-type composite structure, generally indicated at 110, is shown. FIG. 7 shows a stack of thermoplastic-based and cellulose-based sheets or layers or components of material prior to the stack being compression molded into the composite structure 110. It is to be understood that one or more of such structures constructed in accordance with at least one embodiment of the present invention may be used in a wide variety of environments including an automotive vehicle environment. For example, the structure 110 may be a load-bearing vehicle component or a vehicle interior trim component.

The structure 110 is typically manufactured via a thermo-compression process by providing the stack of material located or positioned within a low pressure, thermo-compression mold generally of the type shown in FIGS. 3-5. As shown in FIG. 7, the stack includes the thermoplastic component 12 of FIG. 1, a carpet layer 122, first and second reinforced thermoplastic skins or outer layers 112 and 114, respectively, a cellulose-based core having a large number of cavities such as a paper or cardboard cellular core 116 disposed between and bonded to plys or films or sheets of hot-melt adhesive (i.e. thermoplastic adhesive) 118 and 120 which, in turn, are disposed between and bonded to the skins 112 and 114 by the press or compression molding. The sheets 118 and 120 may be bonded to their respective skins 112 and 114 prior to the press molding or are preferably bonded during the press molding. The thermoplastic of the sheets 118 and 120 is typically compatible with the thermoplastic of the skins 112 and 114 so that a strong bond is formed therebetween. One or more other resins may also be included within the adhesive of the sheets 118 and 120 to optimize the resulting adhesive system. The adhesive system is not a solvent-based adhesive system.

The substantially continuous covering or carpet layer, generally indicated at 122, made of thermoplastics material covers the first skin 112. The component 12, the covering 122, the skins 112 and 114 and their respective sheet or film layers 118 and 120 (with the core 116 in between the layers 118 and 120) are heated typically outside of the mold (i.e. in an oven) to a softening temperature wherein the hot-melt adhesive becomes sticky or tacky. The mold is preferably a low-pressure, compression mold which performs a thermo-compression process on the stack of materials.

Figure 10:
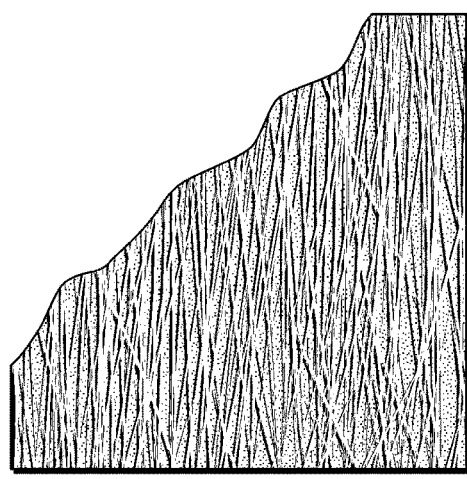
FIG. 10 is a top plan view, partially broken away, of a reinforced thermoplastic skin having substantially parallel, visible fibers.
Figure 11:
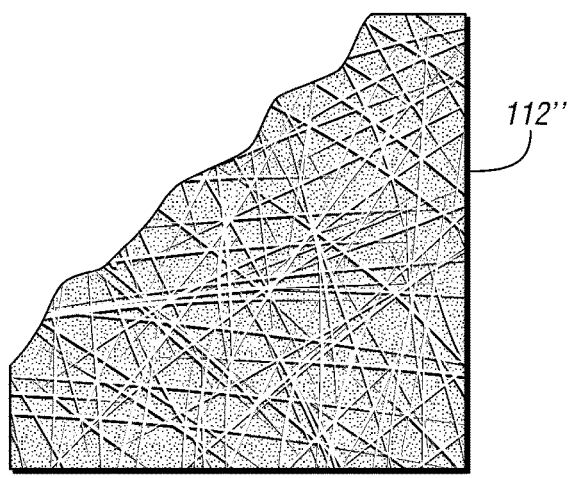
FIG. 11 is a view similar to the view of FIG. 10 but with substantially randomly oriented visible fibers.

The step of applying the pressure compacts and reduces the thickness of the cellular core 116 and top and bottom surface portions of the cellular core 116 penetrate and extend into the film layers 118 and 120 without penetrating into and possibly encountering any fibers located at the outer surfaces of the skins 112 and 114 thereby weakening the resulting bond. Often times the fibers in the skins 112 and 114 are located on or at the surfaces of the skins as shown by skins 112' and 112" in FIGS. 10 and 11, respectively, wherein the fibers are substantially parallel and randomly oriented, respectively.

The carpet layer 122 may be a resin carpet and the resin may be polypropylene. The carpet layer 122 may be made of a woven or nonwoven material (typically of the carpet type).

An optional bottom layer of the structure 110 comprises a decorative, noise-management, covering layer 124 bonded to the bottom surface of the structure 110 to provide sound insulation and an aesthetically pleasing appearance to the bottom of the structure 110 if and when the bottom of the panel 116 is exposed to a passenger of the vehicle or others. In other words, the covering layer 124 reduces the level of undesirable noise in a passenger compartment of the vehicle.

The cellulose-based, cellular core 116 may be a honeycomb core. In this example, the cellular core has an open-celled structure of the type made up of a tubular honeycomb, and it is made mainly of cellulose and preferably of paper or cardboard. The sticky or tacky hot-melt adhesive extends a small amount into the open cells during the thermo-compression process. It is also possible to use a cellular structure having closed cells, a material, such as a wooden part, to which the top and bottom film layers 118 and 120, respectively, are bonded.

Each of the skins 112 and 114 may be fiber reinforced. The thermoplastic of the sheets or film layers 118 and 120, the skins 112 and 114, and the covering layers 122 and 124 may be polypropylene. Alternatively, the thermoplastic may be polycarbonate, polyimide, acrylonitrile-butadiene-styrene as well as polyethylene, polyethylene terphthalate, polybutylene terphthalate, thermoplastic polyurethanes, polyacetal, polyphenyl sulphide, cyclo-olefin copolymers, thermotropic polyesters and blends thereof. At least one of the skins 112 or 114 may be woven skin, such as polypropylene skin. Each of the skins 112 and 114 may be reinforced with fibers, e.g., glass fibers, carbon fibers, aramid and/or natural fibers. At least one of the skins 112 and 114 can advantageously be made up of woven glass fiber fabric and of a thermoplastics material.

The resulting structure 110 (minus the component 12) may have a thickness in the range of 5 to 25 mm.

In one example method of making the structure 110, a stack of material may be pressed in a low pressure, cold-forming mold (not shown but generally of the type shown in FIGS. 3-5). The stack is made up of the component 12, the first skin 112, the first film layer 118, the paper cellular core 116, the second film layer 120, the second skin 114 and the covering layers 122 and 124, and is pressed at a pressure lying in the range of $10 \times 10^5$ Pa. to $30 \times 10^5$ Pa. The component 12, the first and second skins 112 and 114, and the first and second film layers 118 and 120 are preferably pre-heated to make them malleable and stretchable. Advantageously, in order to soften the first and second skins 112 and 114, and their respective film layers 118 and 120, respectively, heat is applied to a pre-assembly made up of at least the first skin 112, the first film layer 118, the paper cellular core 116, the second skin 114 and the second film layer 120 so that, while the structure 110 is being formed in the mold, the first and second skins 112 and 114 and the film layers 118 and 120 have a forming temperature lying approximately in the range of 160° C. to 200° C., and, in this example, about 180° C.

The covering layer 122 is substantially continuous and may be formed from separate pieces of thermoplastic resin carpet which are subsequently bonded or fused together, such as by heat and/or pressure to carpet the entire top surface of the structure 110.

The bottom layer 124 of the structure 110 may be made of a nonwoven scrim 124 of fine denier, spunbond thermoplastic (i.e., polypropylene and/or polyester or other thermoplastic compatible to the process) fibers in the form of a sheet and having a weight in a range of 8 to 100 gsm (i.e., grams per square meter). Preferably, the weight is in a range of 17 to 60 gms. Also, preferably, the denier is in a range of 1.8 to 2.2.

The scrim 124 has an open mesh of nonwoven synthetic thermoplastic fibers including a plurality of adjacent openings. The scrim 124 both transmits light to the underlying layer and reflects light while reducing the level of undesirable noise from a different area of the vehicle. The scrim 124 may be manufactured in a color which is substantially the same, complements or is in contrast with the color of the upper carpet 122. Also, the structure 110 including the underlying scrim layer 124 and the carpet 122 can be made in a single compression molding step.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method of bonding a thermoplastic component to a carpeted component and the carpeted component to a cellulose-based core in a single pressing step, the method comprising:

providing a stack of materials comprising a base component of a reinforced thermoplastic material, a solid thermoplastic component, a fibrous carpet between the components, a sheet of thermoplastic adhesive and a core of cellulose-based material, the carpet having a plurality of cavities, the carpet overlying and in contact with the base component and the thermoplastic component overlying and in contact with the carpet, the carpet being made of a thermoplastic material whose fibers become softened and bond to the thermoplastic component in response to heat at the interface between the thermoplastic component and the carpet;

heating the carpet at the interface between the thermoplastic component and the carpet for a period of time to soften the carpet fibers; and pressing the components, the sheet, the core and the softened carpet together under a pressure to cause the softened carpet fibers to flow into the cavities wherein the fibrous carpet at the interface is transformed into a solid bonding layer to bond the components together and the sheet bonds the base component and the core together to create a finished structure.

2. The method as claimed in claim 1, wherein the carpet is made of non-woven fibers.

3. The method as claimed in claim 1, wherein the carpet is made of woven fibers.

4. The method as claimed in claim 1, wherein the carpet has an upper thermoplastic fiber layer and a lower thermoplastic backing layer.

5. The method as claimed in claim 1, wherein at least a portion of the carpet bonds the components together.

6. The method as claimed in claim 1, wherein the entire carpet bonds the components together.

7. The method as claimed in claim 1, wherein the thermoplastic of the carpet and the thermoplastic of the thermoplastic component are polypropylene.

8. The method as claimed in claim 1, wherein the thermoplastic of the carpet and the thermoplastic of the thermoplastic component are polyester.

9. The method as claimed in claim 1, wherein the step of heating occurs before the step of pressing and wherein the components and the fibrous carpet are cold-pressed during the step of pressing.

10. The method as claimed in claim 1, wherein the base component is a skin or layer made of a fiber-reinforced thermoplastic material.

11. The method as claimed in claim 1, wherein the carpet has a surface area greater than a surface area of the thermoplastic component and wherein a portion of the carpet spaced away from the interface is not transformed and forms an outer exterior surface of the finished structure.

12. The method as claimed in claim 1, wherein the step of heating occurs during the step of pressing and wherein the thermoplastic component and the carpet are welded to each other at the interface.

13. The method as claimed in claim 1, wherein a temperature at the interface lies in a range of 160° C. to 200° C. during the step of heating.

14. The method as claimed in claim 1, wherein the pressure lies in a range of $1\times10^6$ Pa to $3\times10^6$ Pa.

15. The method as claimed in claim 1, wherein both of the components are heated to a temperature above a softening temperature of the carpet fibers during the step of heating.

16. The method as claimed in claim 1, wherein the step of pressing includes the step of press molding in a compression mold.

17. The method of claim 1, wherein the solid thermoplastic component is a single piece as provided in the stack of materials.

18. A method of bonding a thermoplastic component to a carpeted component and the carpeted component to a cellulose-based core in a single pressing step, the method comprising:

providing a stack of materials comprising a base component of a reinforced thermoplastic material, a solid one-piece thermoplastic component, a fibrous carpet between the components, a sheet of thermoplastic adhesive and a core of cellulose-based material, the carpet having a plurality of cavities, the carpet overlying and in contact with the base component and the thermoplastic component overlying and in contact with the carpet, the carpet being made of a polypropylene thermoplastic material whose fibers become softened and bond to the thermoplastic component in response to heat at the interface between the thermoplastic component and the carpet;

heating the carpet at the interface between the thermoplastic component and the carpet in a range of 160° C. to 200° C. for a period of time to soften the carpet fibers; and pressing the components, the sheet, the core and the softened carpet together under a pressure to cause the softened carpet fibers to flow into the cavities wherein the fibrous carpet at the interface is transformed into a solid bonding layer to bond the components together and the sheet bonds the base component and the core together to create a finished structure.

* * * * *